July 1, 1958

J. L. NISBET 2,840,991

ROTARY PUMP AND MOTOR HYDRAULIC TRANSMISSION

Filed June 24, 1954

INVENTOR:
JOHN L. NISBET

BY  Eaton & Bell

ATTORNEYS

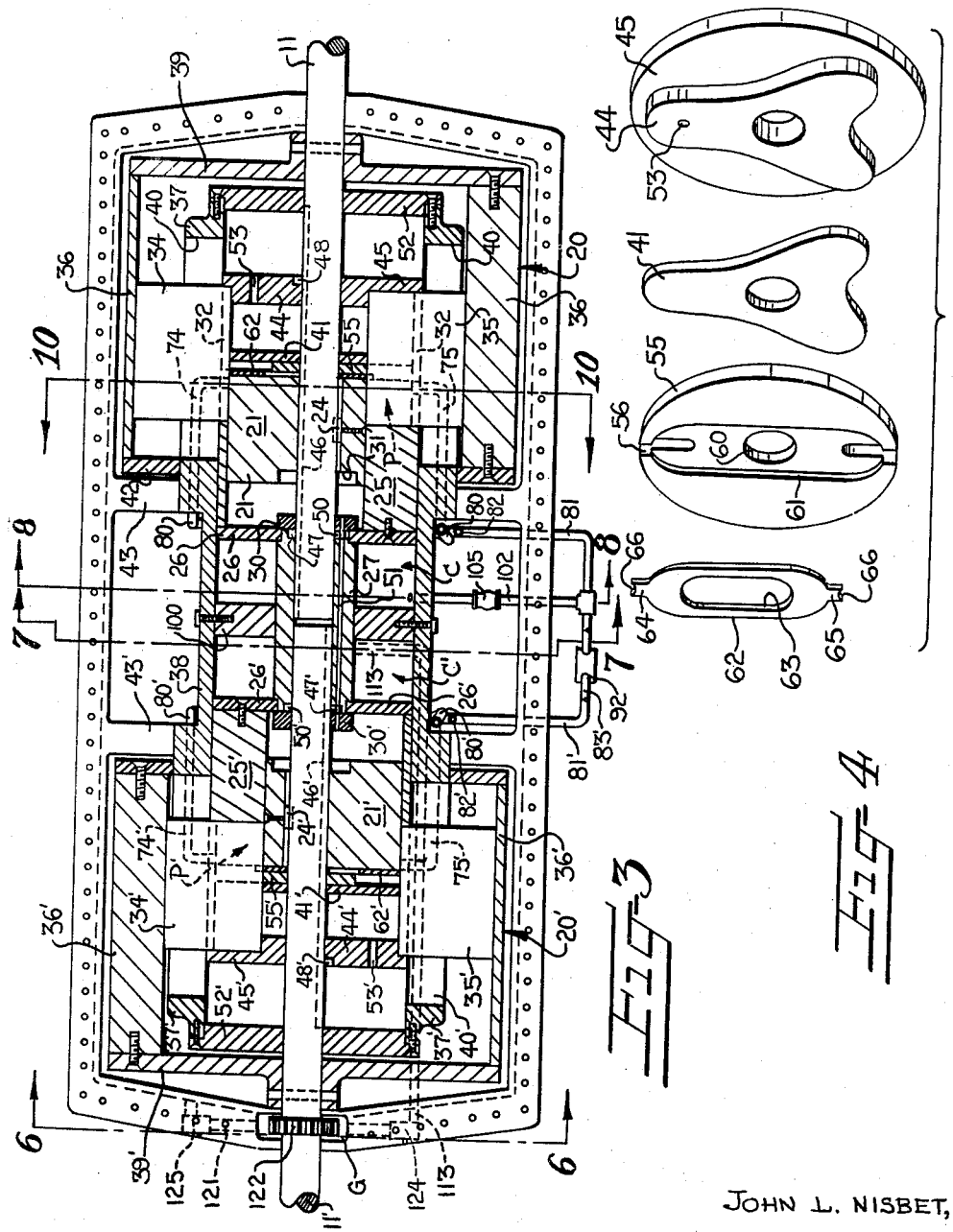

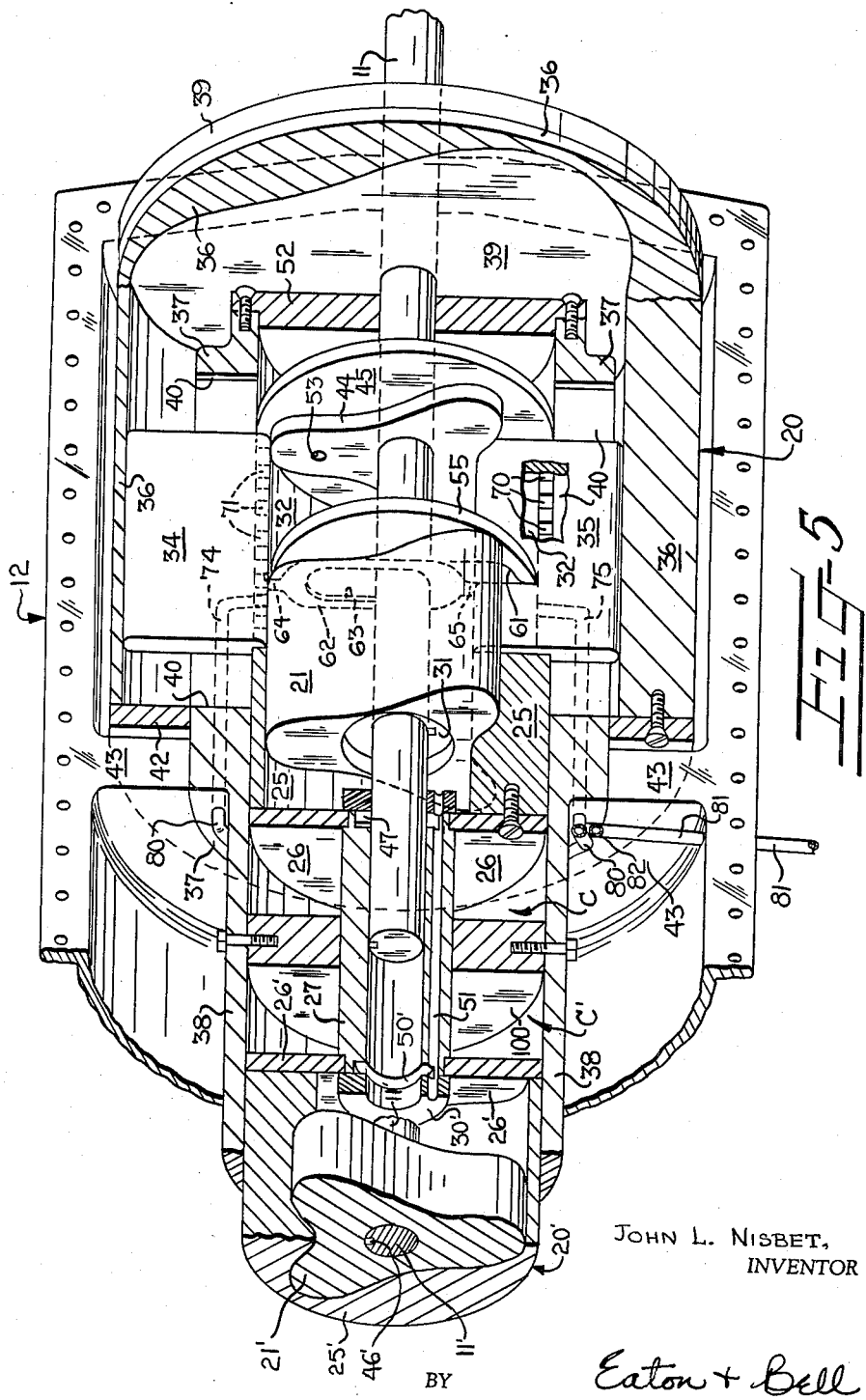

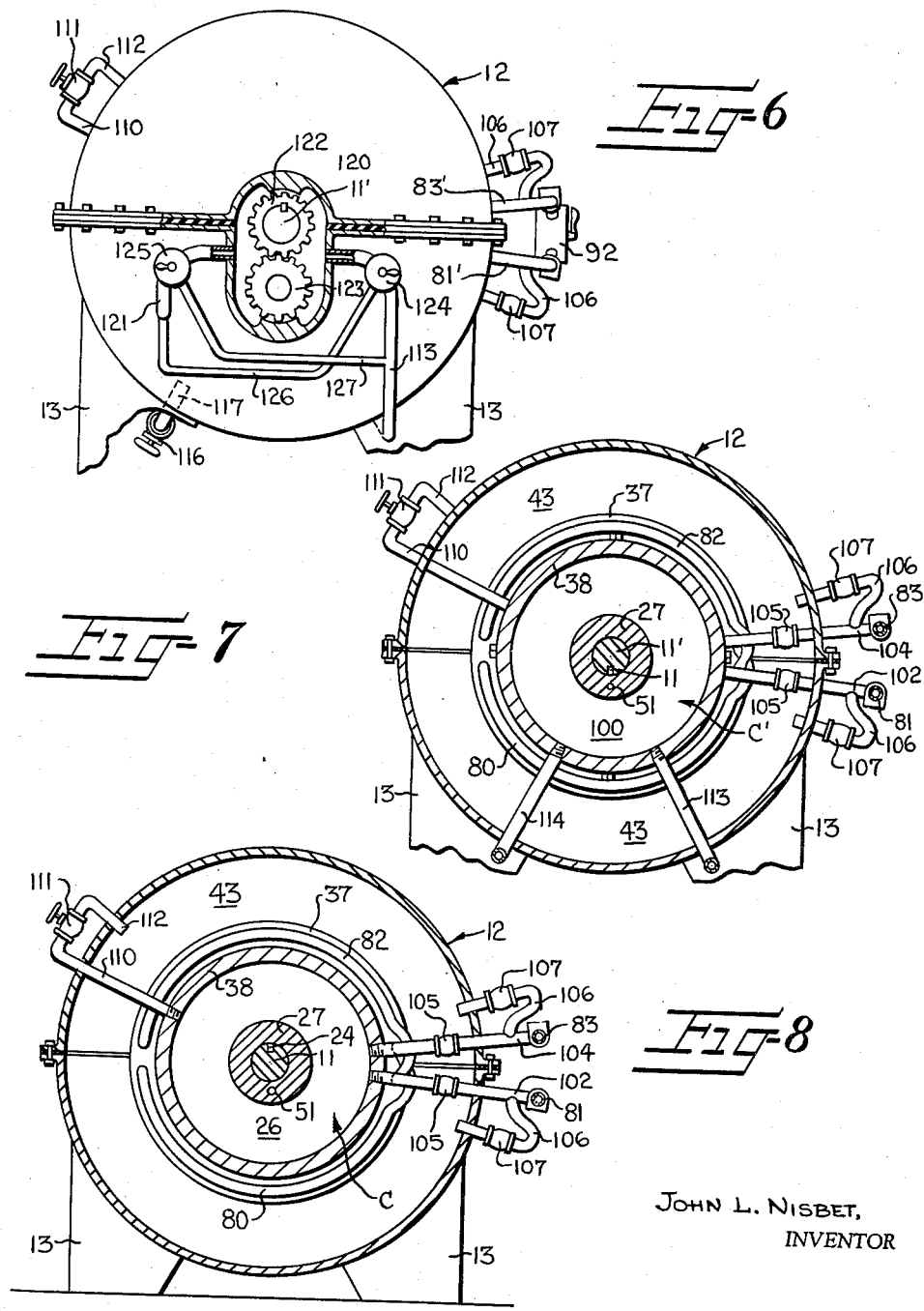

JOHN L. NISBET,
INVENTOR

By Eaton + Bell
ATTORNEYS

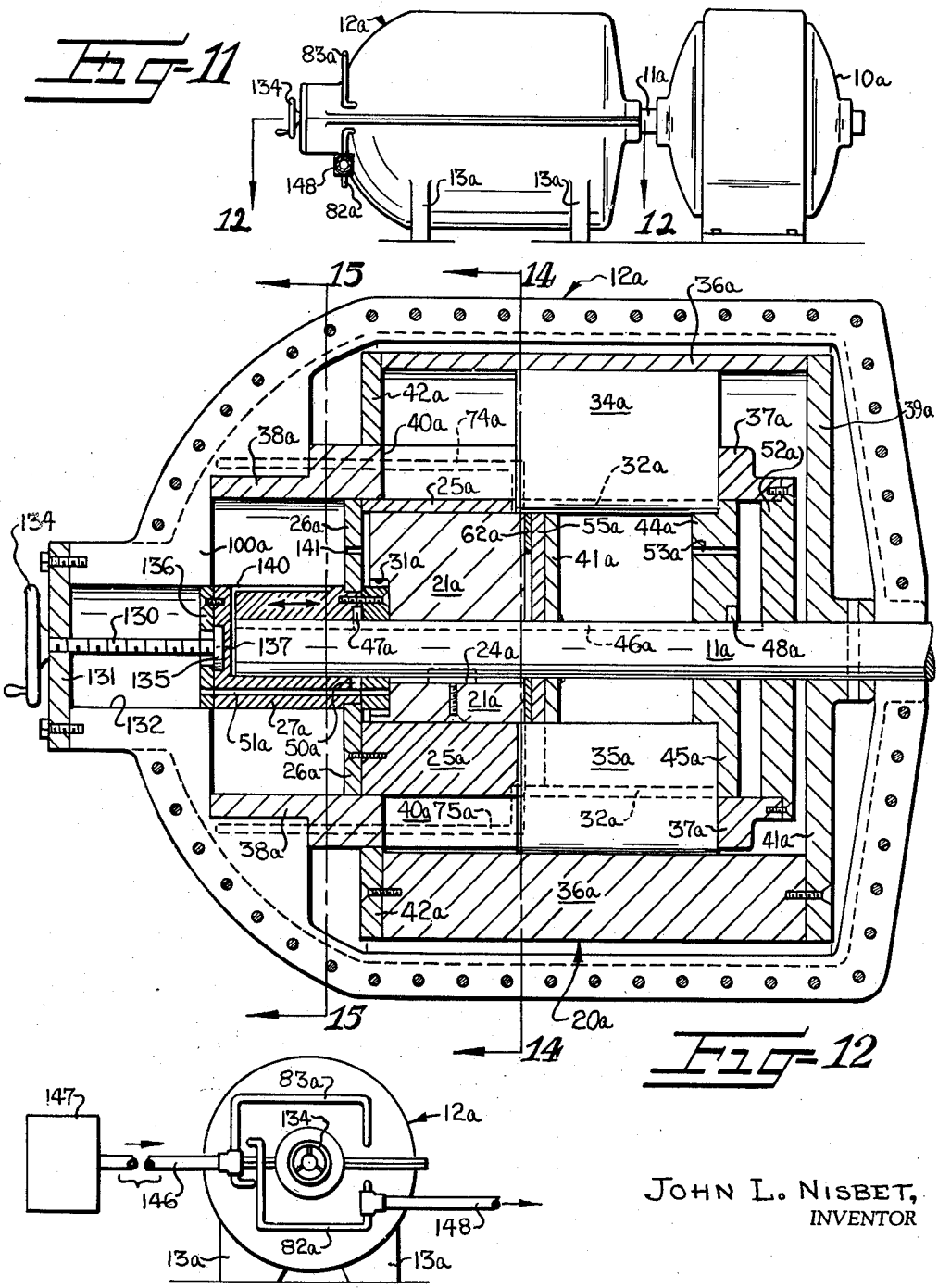

July 1, 1958    J. L. NISBET    2,840,991
ROTARY PUMP AND MOTOR HYDRAULIC TRANSMISSION
Filed June 24, 1954    7 Sheets-Sheet 7

JOHN L. NISBET,
INVENTOR

BY Eaton + Bell

ATTORNEYS

United States Patent Office 2,840,991
Patented July 1, 1958

2,840,991

ROTARY PUMP AND MOTOR HYDRAULIC TRANSMISSION

John L. Nisbet, Winston-Salem, N. C.

Application June 24, 1954, Serial No. 439,111

21 Claims. (Cl. 60—53)

This invention relates to fluid pressure pumps and, more especially, to an improved hydraulic or fluid pressure pump and transmission of the rotary cam sliding vane type.

It is an object of this invention to provide an improved fluid pressure pump having a novel and efficient means for pumping fluid in a unique manner and embodying means for minutely varying the capacity thereof at any point between zero or minimum and maximum without necessarily varying the speed of the rotative elements of the rotary cam pump.

It is another object of this invention to provide an improved power unit, which may serve as a pump or motor, comprising an internal or male irregularly-shaped core cam and an external or female irregularly-shaped intermediate cam the proximal surfaces of which cams are shaped to conform with each other and which cams are driven to rotate in unison. The internal and external cams are mounted for relative axial movement so a portion of the internal cam may extend varying distances beyond the corresponding end of the external cam. The exposed portion of the internal cam engages the inner surface or edge of one or a plurality of circularly-spaced vanes or gates which are mounted for radial and axial sliding movement in an auxiliary cam housing. Another or outer female cam, having surfaces formed concentric with the exterior surfaces of the male cam, engages the radially outermost edges of the gates to maintain the latter in engagement with the periphery of the internal or male core cam.

A closure means is provided on the outer end of the internal or male cam, relative to which the male or internal cam rotates and which is substantially circular so that it closes the interspaces formed between the relatively high points of the cams and thus defines one end of a "work chamber" whose other end is defined by the corresponding end of the axially movable intermediate female cam. Means are provided for feeding or directing fluid into said work chamber adjacent the forward or leading surface of each of said gates or vanes relative to the direction or rotation of the rotating internal cam or male cam and other means are provided for directing the fluid placed under pressure out of the work chamber adjacent the rear or trailing surface of each of said gates or vanes relative to the direction of rotation of the internal cam or male cam.

It follows that, as the distance between corresponding ends of the internal or male cam and the axially movable intermediate female cam is increased, the size of the work chamber is correspondingly increased and the rate of flow of the fluid into and out of the work chamber is correspondingly increased. Conversely, as the distance between the proximal ends of the internal or male cam and the mating female or external cam is decreased, the effective area of the work chamber is correspondingly decreased and the rate of flow of the fluid into and out of the work chamber is also correspondingly decreased.

It is another object of this invention to provide a fluid transmission wherein the principles of a pump or motor of the character described are applied and in which a plurality of power units of the character described are employed. In one form of the invention, two such power units are provided in which the fluid pressure developed by one of the power units is transmitted to the work chamber of the other of said power units by means such that the rotatable cams of the second power unit are driven by the fluid pressure at a ratio proportionate to the amount of torque which must be overcome by the rotating elements or cams of the second power unit. Thus, the first power unit operates as a pump and the second power unit operates as a motor.

Fluid transmission connections are provided between the external or female cams of the pump and motor, which mate with the corresponding male or internal cams, so that the greater the amount of torque which must be overcome by the rotary elements or cams of the motor with the resultant relatively greater fluid pressure required in the motor for rotating the cams of the motor, the greater will be the area between corresponding ends of the mating male and female cams of the motor and the proportionately lesser will be the area of the pump, thus providing an infinitely variable ratio between the pump and the motor. That is, under a relatively heavy load, the ratio between the pump and the motor will be infinitely high in reduction and, under relatively low loads, the ratio between the pump and motor may be infinitely high in overdrive. In the event that the motor becomes a driven pump, such as would be the case when the device is used in an automotive vehicle and the automotive vehicle is moving on a down grade, the ratio between the motor and the pump would react in the same manner as heretofore described, even though in this case, the changes in ratio would be providing for deceleration requirements.

Some of the objects of the invention having been stated, other objects will appear as the description proceeds, when taken in connection with the accompanying drawings, in which—

Figure 3 is an enlarged longitudinal section plan view of the fluid transmission taken substantially along the line 3—3 in Figure 1 and in which the axially movable cams of the pump and motor are shown in the position occupied thereby when the pump and motor are in a one-to-one ratio and when the torque and speed of the input and output shafts is equal.

Figure 4 is an enlarged exploded perspective view of the work chamber sealing elements and gate guiding outboard elements of the fluid unit shown in the right-hand portion of Figure 3;

Figure 5 is an enlarged cut-away sectional plan view showing the parts in the right-hand portion of Figure 3 in perspective;

Figure 6 is an enlarged elevation, partially in section, taken substantially along line 6—6 in Figure 1;

Figure 7 is a transverse vertical sectional view taken substantially along line 7—7 in Figure 3;

Figure 8 is a transverse vertical sectional view taken substantially along line 8—8 in Figure 3;

Figure 11 is an elevation of another form of pumping device in which the principles of the present invention are applied;

Figure 12 is an enlarged longitudinal sectional plan view taken substantially along line 12—12 in Figure 11;

Figure 13 is an elevation looking at the left-hand end of Figure 11;

There are two forms of the invention illustrated in the annexed drawings, in one of which the principles of the present invention are applied to a hydraulic or fluid transmission and in the other of which the principles of the present invention are applied to a pump for developing fluid pressure or for transmitting fluid from one place to another or to one or more other hydraulic motors or hydraulic devices. The principles of the present invention as applied to a fluid transmission will now be described.

Figure 1:
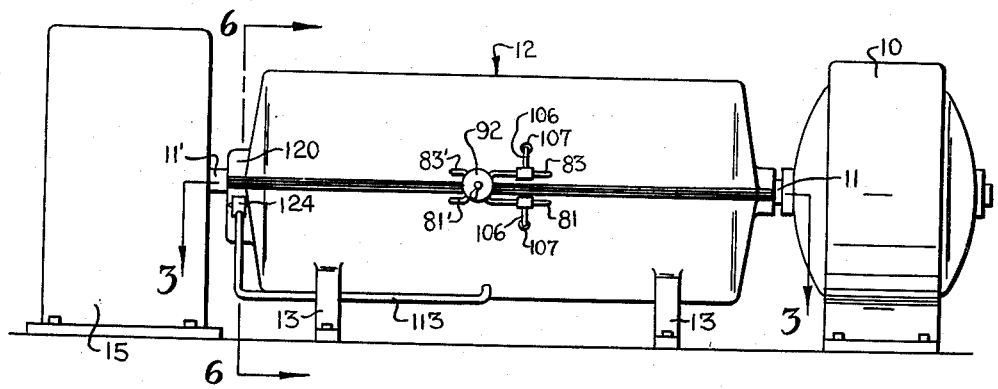
Figure 1 is a somewhat schematic elevation illustrating one embodiment of the invention as applied to a fluid transmission.

In Figure 1, the numeral 10 generally designates a suitable prime mover, such as an electric motor or internal combustion engine, for driving an input shaft 11 journaled in one end of a main or outer housing or casing 12 of the improved fluid or hydraulic transmission which is shown, in this instance, as being formed from upper and lower halves suitably secured to each other and the lower half of which may be supported on pedestals 13. The improved transmission also has an output shaft 11' which drives a mechanical device 15 of any desired construction. For purposes of description, it may be assumed that the prime mover 10 represents the internal combustion engine of an automotive vehicle and that the mechanical device 15 represents connections to the rear wheels of an automotive vehicle and which mechanical device 15 places varying degrees of torsional resistance to rotation on the shaft 11'.

Disposed within the casing 12 are axially spaced fluid power units broadly designated at 20, 20' which shall be termed as a pump and a motor, respectively, and which are substantially identical, except being opposite hand. Since the pump 20 and motor 20' are substantially identical, only the pump 20 will be described in detail and like parts associated with the motor 20' will bear the same reference characters with the prime notation added, where applicable.

The pump 20 comprises a main inner rotatable core cam 21 whose outer periphery is irregularly-shaped and which, in this instance, is shown in the form of a three-lobe cam. The cross-sectional configuration of the main core cam 21 and mating parts may vary without departing from the spirit of the invention. The three lobes of the main core cam 21 are connected to the low points thereof by curves of uniform acceleration and deceleration. The main core cam is suitably secured to the medial portion of the input shaft 11 by any suitable means such as an elongated key element 24. Thus, the main core cam 21 rotates in fixed relation to the shaft 11.

Mounted for axial sliding movement on the inner rotatable core cam 21 is inner female cam or intermediate cam 25 whose outer periphery is circular and whose inner periphery is irregularly-shaped to conform substantially to the irregularly-shaped periphery of the main core cam 21. Cam 25 serves to shift a plurality of gates or vanes axially, as will be later described, and also determines the size of a work chamber P. The inner end of the intermediate cam 25 has a hub in the form of a disk or annular plate 26 suitably secured thereto which is loosely mounted on a reduced portion of a floating sleeve or tubular member 27. The annular plate or disk 26 is restrained from axial movement relative to the floating sleeve 27 by any suitable means such as a retaining ring 30 fixed on the corresponding reduced end of the floating sleeve 27.

Figure 9:
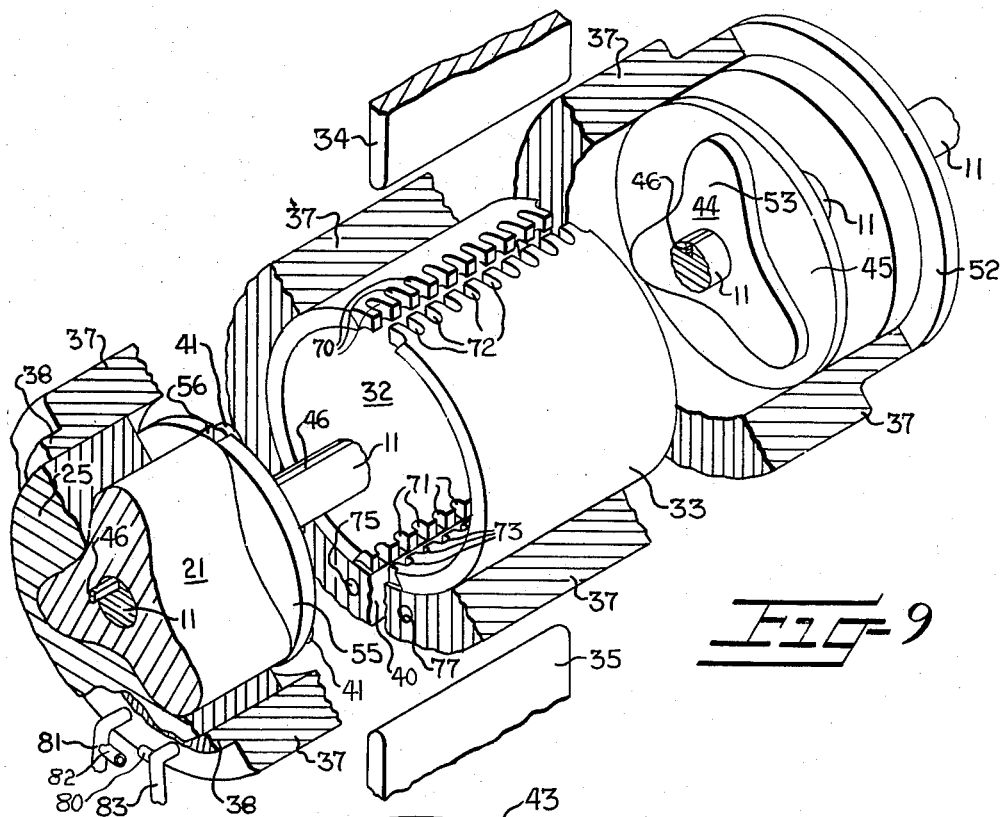
Figure 9 is an enlarged, exploded, cut-away isometric view particularly illustrating the semi-circular work chamber wall members in the right-hand portion of Figure 3, said members being turned on their sides for purposes of clarity.

It should be noted that the floating sleeve 27 is rotatably and slidably mounted on the proximal ends of the input and output shafts 11, 11' and the inner end of the inner core cam 21 is provided with a suitable recess 31 of a depth slightly less than the thickness of the retaining ring 30 and in which the retaining ring 30 fits when the disk 26 is disposed in close proximity to the inner end of the core cam 21. Thus, the retaining ring 30 serves as a stop to control maximum underdrive; that is, the ring 30 prevents the outer end of inner female cam 25 from becoming flush with the outer end of core cam 21 at any time. The outer end of the inner female cam 25 engages a tubular wall whose inner periphery, at least, must be round or circular and which is embodied in a pair of substantially semi-circular or segmental work chamber wall members 32, 33 which are most clearly shown in Figure 9 and whose adjacent edges are spaced from each other to form diametrically opposed slots therebetween to accommodate a pair of substantially diametrically opposed gates or vanes 34, 35 for radial sliding movement therebetween.

The proximal or radially inward edges of the gates or vanes 34, 35 are preferably rounded and partially engage the periphery of the main core cam 21 and are maintained in engagement therewith by an external or outer rotatable female cam 36 whose inner cam surface is spaced from, but shaped to conform substantially concentrically with, the outer surface of the main core cam 21, although the axial length of the cam 36 is substantially greater than that of the core cam 21. The outer female cam 36 is a preferred means to maintain the gates 34, 35 in engagement with core cam 21. However cam-operated-levers or resilient means, such as spring bands, coiled springs, hydraulic pressure, or the like may be used in lieu of the female cam 36, if desired. In order to assist in supporting the intermediate female cam 25 for rotation and to also prevent rotation of the gates or vanes 34, 35 while permitting radial movement of the gates or vanes 34, 35, an elongated inner female cam housing 38 is provided which forms a part of both the pump 20 and the motor 20' and in which the inner female cams 25, 25' are mounted for axial sliding movement along with the disks 26, 26' and the segmental work chamber wall members 32, 33 and 32', 33'.

Figure 10:
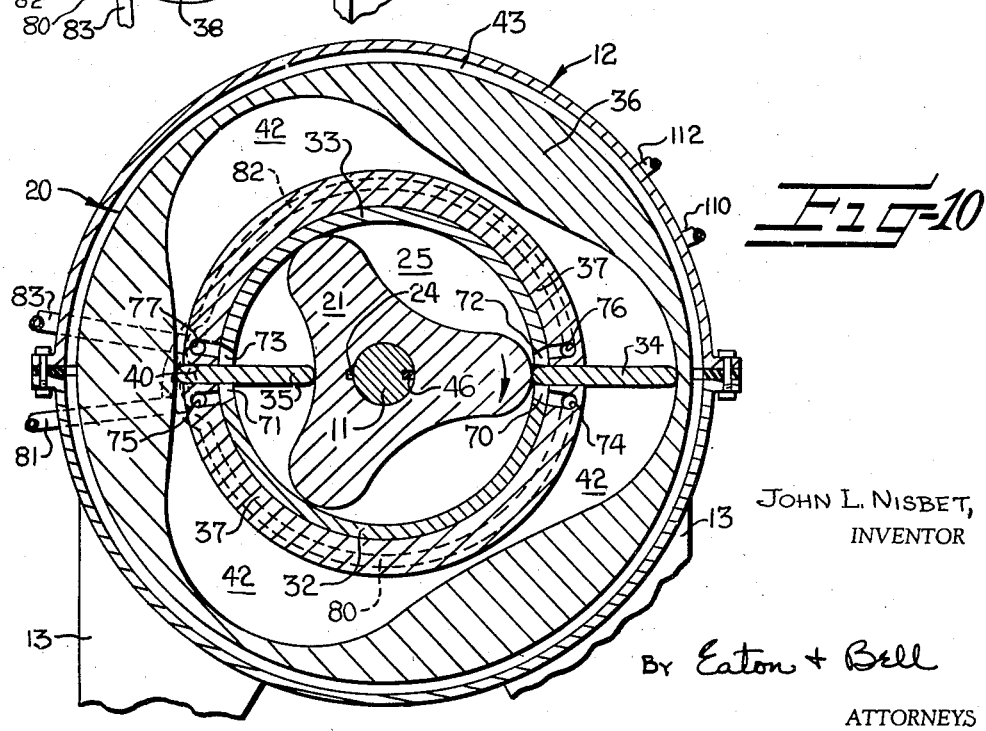
Figure 10 is an enlarged transverse vertical sectional view, with parts broken away, taken substantially along line 10—10 in Figure 3.

The inner female cam housing 38 has elongated enlarged portions 37, 37' on opposite ends thereof which are provided with respective longitudinally extending radial slots 40, 40' (Figures 3, 5, and 10) in which the corresponding vanes 34, 35 and 34', 35' have radial and axial sliding movements. The width of each slot 40, 40' is substantially the same as the distance between the proximal edges of the corresponding semi-circular work chamber wall members 32, 33 and 32', 33'. Of course, the external diameter of the enlarged portions 37, 37' is substantially the same or less than the diameter defined by the arc of movement of the low portions of the inner cam surfaces of the outer female cams 36, 36' as best shown in Figures 3, 5, and 10.

In order to insure that the outer female cam 36 rotates in fixed relation to the main core cam 21 and the input shaft 11, the outer end of the outer female cam 36 has a closure plate or disk 39 suitably secured thereto and disposed outwardly of the corresponding end of the elongated female cam housing 38 and whose hub is suitably secured to the input shaft 11. The inner end of the outer cam 36 has an annular plate 42 fixed thereto which is supported for rotation on the periphery of the corresponding enlarged portion 37 of the inner female cam housing 38. The inner female cam housing 38 is fixed in a pair of spaced annular projections 43, 43' integral with or suitably secured to the main housing 12 and whose distal or outer end surfaces are disposed in close proximity to the inner end surfaces of the respective annular members 42, 42' on the respective outer female cams 36, 36'.

As the intermediate female cam 25 moves axially relative to the core cam 21, it is apparent that the gates 34, 35 move axially relative to the core cam 21 and, therefore, in order to support and guide the rounded radially inward edges of the gates 34, 35 when the outer edge of the intermediate female cam 25 is substantially flush with the axial outer surface of the core cam 21, a pair of axially spaced intermediate and outer core cams 41, 44 are provided (Figures 3, 4, 5, and 9) whose peripheries are of the same configuration as the outer periphery of the main core cam 21. It will be observed in Figure 4 that the outermost core cam element 44 has an enlarged relatively thin circular member or plate 45 integral therewith or fixed thereto which serves as a confining means for the axially outer edges of the gates 34, 35 and the work chamber wall members 32, 33. In other words, the plate 45, which is rotatable and slidable in the inner female cam housing 38, maintains the axially innermost edges of the gates 34, 35 and the segmental wall members 32, 33 in relative sliding rotational engagement with the outer end of the intermediate female cam 25.

The intermediate core cam 41 is fixed on the input shaft 11, but the cam 44 and its circular portion 45 must move axially in unison with the intermediate female cam 25 and the floating sleeve 27. Thus, an elongated key 46 is slidably mounted in a relatively longer keyway provided therefor in shaft 11 and opposite ends of the key 46 are provided with outwardly projecting portions 47, 48. Portion 48 fits in a corresponding notch provided therefor in the outer end of the circular member 45 on the outer core cam 44. Although only a single key 46 is shown in Figures 3 and 8, it is to be understood that any desired number of such keys may be provided or the input shaft 11 may be splined or any other suitable means may be provided for maintaining the outer core cam 44 in fixed relation to the axially movable intermediate female cam 25 and the disk 26. Since the intermediate female cam 25, the outer core cam 44 and its circular plate 45, the disk 26 and the input shaft 11 may, at times, rotate relative to the floating sleeve 27, an annular grove 50 (Figures 3 and 5) is provided in the floating sleeve 27 to accommodate the outwardly projecting portion 47 on the inner end of the key 46. The projection 47 is held in groove 50 by retainer 30.

The outer casing 12 and the spaces between the various parts disposed therein are substantialy filled with oil or other hydraulic fluid. In order to permit the fluid to pass from within the confines of the intermediate female cam 25 and the intermediate female cam 25' with movement of these cams relative to the core cams 21, 21', the floating sleeve 27 has a longitudinally extending passageway 51 therein, which passageway also extends through the retaining collars 30, 30'. Opposite ends of the elongated female cam housing 38 are closed by end members 52, 52' and the outer rotatable core cams 44, 44' and their corresponding circular plates 45, 45' are provided with openings or passageways 53, 53' therethrough to permit passage of the fluid from one side of the outer core cams 44, 44' to the other during reciprocation thereof.

It will be observed in Figures 2, 3, 5 and 10 that, when either of the gates or vanes 34, 35 is in engagement with the low point of the inner core cam 21, the rounded radially inner edge of the corresponding gate or vane is disposed substantially inward of the inner surfaces of the segmental wall members 32, 33 and that portion of the peripheral surface of the inner core cam 21 which is then in engagement with the radially inner edge of the corresponding vane or gate then defines the radially inner wall of a work chamber P whose axially inner wall is defined by the outer surface of the corresponding intermediate female cam 25. An axial outer wall member or disk 55 serves as the outer wall of the work chamber P and also serves as a radial guide for the inner portions of the gates or vanes 34, 35.

To this end, the disk 55 is provided with a pair of substantially diametrically opposed slots 56, 57 (Figures 4 and 9) through which the corresponding inner portions of the respective gates 34, 35 loosely extend whenever their radially inward edges are not in engagement with the highest points or lobes of the inner core cam 21. The diameter of the axial outer work chamber wall 55 is substantially the same or slightly less than the inside diameter collectively of the segmental or semi-circular wall members 32, 33 and the disk 55 has a centrally disposed opening 60 therethrough which is sufficiently large to permit the input shaft 11 to rotate relative to the disk 55. The disk 55 is restrained from axial movement on shaft 11 by the main and intermediate core cams 21, 41.

In order to assist in sealing the outer end of the work chamber P, the inner face of the work chamber closure disk 55 is provided with a diametrically extending recess 61 of substantially greater width than the width or diameter of the opening 60 and whose walls are rounded at opposite ends thereof, terminate short of the periphery of the disk 55, and communicate with the outer ends of the slots 56, 57. A radially reciprocable shield or sealing element 62 slidably fits in the recess 61 and its opposed walls are shaped to conform substantially to the walls of the recess 61.

The shield 62 has an elongated slot or opening 63 therein which extends longitudinally thereof and whose width is substantially the same as the width of the opening 60 in the closure disk 55. The shield 62 has reduced or relatively narrow opposite end portions 64, 65 thereon which alternately extend through the portions of the respective slots 56, 57 defined by opposite ends of the recess 61 in the closure disk 55. The distal ends of the relatively narrow portions 64, 65 of the shield 62 each preferably has a concave recess 66 (Figure 4) therein which conforms to the curved inner edges of the respective gates or vanes 34, 35. Since the shield 62 is disposed between the gates 34, 35, it follows that the shield 62 reciprocates with the gates 34, 35. Thus, at all positions of the gates or vanes including, when either of the gates or vanes 34 or 35 is in its outermost position radially of the input shaft 11, the corresponding slot 56 or 57 is substantially closed by the shield 62.

Opposed longitudinal edges of the segmental wall member 32 are provided with respective rows of closely spaced relatively small radially extending and tapered passageways 70, 71 (Figures 9 and 10) and opposed edges of the segmental wall member 33 are provided with respective rows of closely spaced, radially extending and tapered passageways 72, 73, thus providing a row of passageways in the segmental wall members 32, 33 adjacent each side of each of the gates or vanes 34, 35 (Figure 5).

Figure 2:
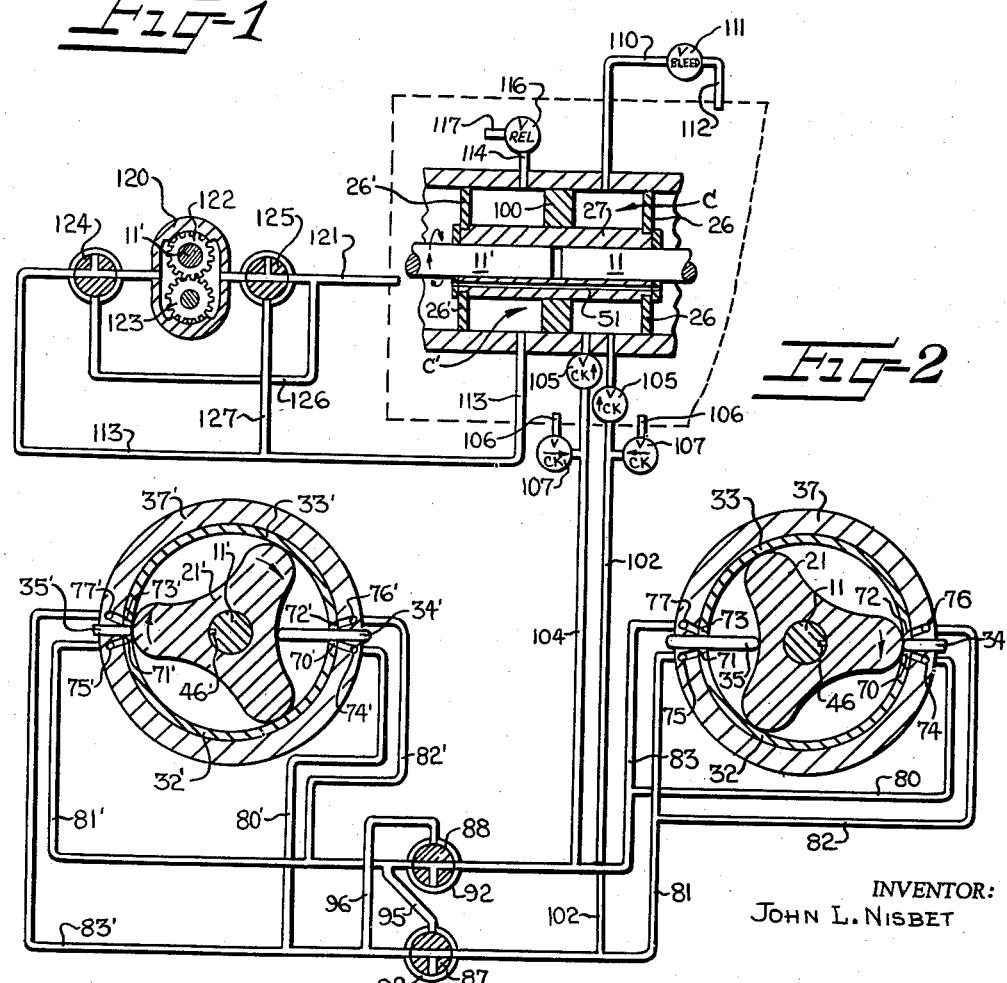
Figure 2 is a schematic and somewhat diagrammatic illustration of the invention as used in a fluid transmission and showing the conduits and controls interposed between two such co-acting units.

The enlarged portion 37 of the housing 38 is provided with a pair of passageways 74, 76 which straddle the gate 34 and a pair of passageways 75, 77 which straddle the gate 35. It will be noted in Figure 3 that these passageways communicate with certain of the respective passageways 70, 72, 71, 73 in the segmental wall members 32, 33 and then extend radially outwardly and then axially inwardly and have corresponding ends of respective fluid conduits 80, 82, 81, 83 communicatively connected thereto (Figure 2). For the sake of brevity, chambers P, P' of the pump 20 and motor 20', respectively, shall be respectively termed as primary and secondary work chambers.

As shown schematically in Figure 2, the enlarged portion 37' of the inner female cam housing 38 is also provided with passageways 74' to 77' to which respective fluid conduits 80' to 83', inclusive, are connected. Corresponding ends of the conduits 80, 82 are connected to medial portions of the respective conduits 83, 81. Corresponding ends of the conduits 80', 82' are connected to medial portions of the respective conduits 83', 81'.

The conduits 81, 81', 83, 83' extend outwardly between the annular portions 43, 43' of, and through the wall of, the main housing or casing 12. Corresponding ends of the conduits 81, 83' are connected to opposite sides of a three-way valve 87 and corresponding ends of the conduits 83, 81' are connected to opposite sides of a three-way valve 88. The valves 87, 88 may be of any desired or conventional construction and, in this instance, they are of the rotatable core type disposed within a common housing 92. Branch conduits 95, 96 are connected to the respective conduits 81', 83' and lead to the respective valves 87, 88.

The central portion of the inner female cam housing 38 has a suitable partition 100 therein which defines co-acting primary and secondary regulating or servomotor chambers C and C' between the proximal surfaces of the disks 26, 26'. The floating sleeve 27 reciprocates axially through the partition 100 and suitable seals, not shown, may be provided between the floating tube 27 and the partition 100 and between the floating tube 27 and the two disks 26, 26' to prevent leakage of the fluid from either of the chambers C, C' to the other or from the chambers C, C' into the spaces between the plates 26, 26' and the respective main core cams 21, 21'.

The conduits 81, 83 have respective branch conduits 102, 104, leading therefrom through the walls of the outer and inner housings 12, 38 and communicating with the chamber C.

Each of the conduits 102, 104 is provided with a suitable check valve 105 to prevent reverse flow of the fluid from within the primary regulating chamber C back through the respective pipes 102, 104. The inner female cam housing 38 also has a conduit 110 connected thereto for communication with the chamber C and whose other end is connected to a suitable bleeder valve 111. A conduit 112 leads from the other side of the bleeder valve 111 back into the casing or main housing 12. In order to replenish the supply of fluid in the work chambers P, P' after a substantial amount of fluid has been discharged therefrom through the intervening conduits, the regulating chamber C and bleeder valve 111 and into the main housing 12, each branch conduit 102, 104 has a branch conduit 106 connected thereto at a point between the corresponding check valve 105 and the corresponding conduits 81, 83 and each conduit 106 has a check valve 107 interposed therein which permits fluid to enter the corresponding conduit when the pressure in said corresponding conduit is negative, but which will not permit fluid to flow into the main housing 12 when the pressure in the corresponding branch conduit is positive.

Also, connected to the stationary intermediate female cam housing 38 and communicating with the chamber C' is a pair of conduits 113, 114. The outer end of conduit 114 is connected to a suitable relief valve 116 from whence a conduit 117 leads to within the main housing 12 for returning fluid thereto as it is released from the secondary regulating chamber C'. The end of the conduit 113 remote from the chamber C' is connected to the normal output side of a suitable auxiliary pump 120 (Figures 1, 2, 3, and 6).

The normal input side of the auxiliary pump 120 has a conduit 121 leading therefrom and communicating with the interior of the main housing 12. The pump 120 is driven by the output shaft 11' and, in this instance, the pump 120 is shown in the form of a gear pump including a pair of gears 122, 123. The gear 122 is fixed on the output shaft 11' and the gear 123 is suitably journaled in the housing of the pump 120. The housing of the pump 120 is shown as being formed integral with the housing 12, although it is to be understood that the housing of the pump 120 may be made separately and positioned remotely from the housing 12.

By rotating the cores of valves 87, 88, the output shaft 11' rotates in the opposite direction relative to the input shaft 11. Accordingly, the pump 120 would then be reversely driven. Therefore, pipes 133, 121 have respective three-way valves 124, 125 interposed therein which may be of the same type as valves 87, 88. Conduits 126, 127 are connected to respective pipes 121, 113 at points remote from auxiliary pump 120 relative to valves 125, 124 and the other ends of conduits 126, 127 are connected to the respective valves 124, 125. It follows that the cores of valves 124, 125 should be rotated whenever the cores of valves 87, 88 are rotated to insure that positive fluid pressure is effected in chamber C' whenever pump 120 is driven in either direction.

It is apparent that suitable seals may be provided between the proximal surfaces of relatively rotatable and relatively axially movable parts of the apparatus, however, all of the various views of the invention are shown somewhat schematically and, since there are various types of seals which may be used where required, these seals have been omitted from the present drawings.

*Method of operation of fluid transmission*

For purposes of description, it shall be assumed that the improved transmission is installed in an automotive vehicle, such as an automobile or truck, and in which instance the prime mover 10 in Figure 1 is representative of the internal combustion engine of the automotive vehicle and, of course, drives the input shaft 11, while the mechanical device 15 represents connections from the output shaft 11' to the rear wheels of the automotive vehicle, since variations in acceleration and deceleration torque characteristics can be easily understood when given with respect to an automotive vehicle. It shall also be assumed that the relief valve 116 in Figure 2 has been so adjusted that the pressure in the secondary regulating chamber C' cannot exceed 300 pounds per square inch. Accordingly, it shall further be assumed that the acceleration and deceleration torque characteristics of the engine 10 are of such magnitude as to enable the engine to develop pressure in excess of 300 pounds per square inch within the primary work chamber P when the inner female cams 25, 25' are in the position of maximum overdrive or, in other words, when the bottom of recess 31 in the main core cam 21 is seated against the retaining ring or stop 30.

It is also to be assumed that the engine 10 has been started and is initially running at idling speed and that the vehicle is at a standstill or at rest. Since the vehicle is at rest, it follows that the output shaft 11' and the auxiliary pump 120 are stationary; as a result the pressure within the secondary regulating chamber C' is zero pounds per square inch, although the chamber C' is filled with fluid. Since the engine 10 is idling, the inner female cams 25, 25' will occupy their extreme right-hand or forward positions as limited by the retaining ring or stop 30 which stop determines the maximum position of underdrive. The inner female cams 25, 25' occupy the latter position whenever the engine 10 is idling because a minimum amount of fluid is being pumped by the pump 20. This small amount of fluid is being pumped through the acceleration pipe lines, which are the pipe lines 82, 81, 83', 80' and 102, in this instance, thus creating positive pressure and feeding fluid into the primary regulating chamber C. However, the bleeder valve 111 is so adjusted and designed as to permit the passage of this small amount of fluid therethrough into the main housing 12 at a pressure of, say, one pound per square inch.

This indicates that the pressure within the primary regulating chamber C is maintained at one pound per square inch as long as the engine 10 does not exceed idling speed. Since the auxiliary pump 120 is at rest, at this time, the pressure in chamber C' would be zero pounds per square inch and, the pressure in chamber C being at one pound per square inch it is apparent that the inner female cams 25, 25' are forced forwardly or to their right-hand position and will remain in this position during idling of the engine 10. This pressure of one pound per square inch extends through the acceleration piping of the transmission into the regulating chamber P' of the motor 20', however, this extremely low pressure does not create sufficient torque within the motor 20' to overcome the friction within the vehicle and, therefore, no forward motion of the vehicle occurs.

*Imparting motion to vehicle on level surface*

Now, assuming that it is desired to effect forward motion of the vehicle along a smooth level roadway and that the rate of acceleration is to be relatively moderate, the speed of the engine or input shaft 11 is increased from an idling speed of, say, four hundred revolutions per minute to, say, two thousand revolutions per minute. Since this increased speed of the engine is five times greater than the idling speed, it is apparent that the volume of fluid being pumped by pump 20 is now five times greater than the volume that was being pumped at idling speed. It is further apparent that the bleeder valve 111 is unable to discharge this large amount of fluid into the main housing 12 without effecting considerably increased pressure in the regulating chamber C. It follows that this increased fluid pressure will also exist in all the acceleration piping heretofore described and in the acceleration portions of the work chambers P, P'. The effect of this pressure increase in chamber C will be to increase the force which tends to hold the inner female cams 25, 25' in their extreme right-hand position, forward position or maximum underdrive position.

Since the inner female cams 25, 25' were already in this position before the pressure increase occurred, it is apparent that no mechanical change will occur within the transmission insofar as the axial positioning of the inner female cams 25, 25' is concerned. The increased speed or rate of rotation of the input shaft 11 causes this increased pressure because, as the main core cam 21 of the pump 20 rotates in a clockwise direction in Figures 2 and 10, the lobes thereof force the fluid against the trailing surfaces or pressure sides of the portions of the corresponding vanes or gates 34, 35 disposed within the circular plane of the lobes of the main core cam 21 so the fluid is forced outwardly through the ports or passageways 71, 72 through the respective passageways 75, 76 and, thus, through the conduits 81, 82 and branch conduit 102 into chamber C.

Since the valves 87, 88 would then occupy the position shown in Figure 2, the fluid under pressure would enter the work chamber P' of the motor 20' through the respective conduits 83', 80' and flow through the corresponding passageways 77', 74' and 73', 70' adjacent the pressure sides or leading surfaces of the respective gates or vanes 35', 34', with respect to the direction of rotation normally to be imparted to the main core cam 21' of the motor 20' and to the output shaft 11'.

As heretofore stated, the inner female cams 25, 25' are disposed in their extreme right-hand or forward position and, consequently, the maximum portions of the gates or vanes 34', 35' are disposed within the work chamber P'. For purposes of description, it shall be assumed that the total cross-sectional area of the portions of the vanes 34', 35' disposed within the chamber P' at this position is, say, ten square inches and the radius of gyration of this area is one third of a foot. It shall be assumed that the pressure now existing in the chambers P, P' will be 10 pounds per square inch. Accordingly, it may be computed from the above assumed figures that the motor 20' will develop a torque of approximately thirty-three and one-third foot pounds. It shall be assumed that this torque is sufficient to initiate rotation of the output shaft 11'.

In order that the operations which occur may be described concurrently with respect to time, it shall now be assumed that the required effective pressure has reached 10 pounds per square inch in the acceleration portions of the work chamber P' at the instant just prior to initiation of rotation of shaft 11'. Since the inner female cams 25, 25' are disposed at their extreme right-hand or forward position, it follows that the minimum portions of the gates or vanes 34, 35 are disposed within the work chamber P. It may be further assumed that the total cross-sectional area of the portions of the gates or vanes 34, 35 disposed within the chamber P is one tenth of a square inch and the radius of gyration of the gates or vanes 34, 35 is the same since the various parts of both the pump and motor 20, 20' are constructed in the same proportions.

It may be assumed that a torque of approximately one-third foot pound is being transmitted from the prime mover or engine 10 to the input shaft 11 at this instance and thus it may be computed that the entire apparatus is now positioned so as to establish a reduction in speed between the input and output shafts respectively at one hundred to one ratio with the equivalent torque multiplication of one hundred to one. Accordingly, shaft 11' commences rotation and, since the gear pump 120 (Figure 2), is driven by the output shaft 11', fluid will be pumped from the main housing 12 through the conduit 121, auxiliary pump 120 and conduit 113 into the secondary regulating chamber C' to immediately create a fluid pressure of, say, 300 pounds per square inch in the secondary regulating chamber C' as the excess fluid directed thereinto is exhausted into the housing 12 through the pressure relief valve 116 (Figure 2). It should be noted that the capacity of the auxiliary pump 120 and the adjustment of the relief valve 116 should be such that a given operating pressure of, say, 300 pounds will be maintained in the secondary regulating chamber C' which will remain constant regardless of the rate of rotation of the output shaft 11', except when the output shaft 11' is rotating at extremely slow speeds or is at rest. Accordingly, throughout the remainder of this description, it should be borne in mind that an established constant pressure is being maintained in the regulating chamber C'. It is this constant pressure that is being used by the transmission as a means against which output torque loads are measured and compensated for.

It should be noted that rotation of output shaft 11' and cams 21', 25', 36' causes fluid to flow through the deceleration lines, embodied in passageways 71', 72', 75', 76', conduits 81', 82', valve 88, conduits 83, 80 and passageways 77, 74, 73, 70 to return the fluid from the motor 20' to the pump 20 as it is forced into the motor 20' by the pump 20 in the manner heretofore described.

At the instant at which the pressure in the regulating chamber C' of motor 20' reaches a value in excess of 10 pounds per square inch; that is, the pressure existing at this same instant in the regulating chamber C of pump 20, it is apparent that a force will be in existence within the transmission which is endeavoring to move the inner female cams 25, 25' axially rearwardly or from right to left in Figure 3.

It is also apparent that this force will, in a relatively short period of time, be at values of considerable magnitude relative to the pressure in the primary regulating chamber C, because the pressure in the secondary regulating chamber C' is rapidly approaching 300 pounds per square inch at the instant at which the inner female cams 25, 25' initiate movement from right to left or rearwardly in Figure 3.

Two primary counteracting forces are effected which prevent the inner female cams 25, 25' from suddenly darting rearwardly or to their extreme left-hand position in Figure 3. These two counteracting forces may be separately considered as follows:

First, there is only one exhaust port through which fluid may be exhausted from the chamber C, this port being embodied in the bleeder valve 111 in Figure 2. This bleeder valve 111 has a discharge capacity which is relatively small and, therefore, it is apparent that it will be impossible for the inner female cams 25, 25' to move rapidly from right to left. Second, as the inner female cams 25, 25' commence movement from right to left or rearwardly in Figure 3, it follows that the gates or vanes 34, 35 are progressively moving therewith thereby progressively increasing the effective cross-sectional area thereof or, in other words, progressively increasing the volume of the work chamber P of pump 20. Also, the capacity of the pump 20 is increasing in direct proportion to the rate of movement of the inner female cams 25, 25' from right to left in Figure 3. Of course, the inverse condition is occurring simultaneously within the work chamber P' of motor 20'.

Assuming, as heretofore stated, that the engine 10 is capable of developing pressure in the work chamber P in excess of 300 pounds per square inch when the inner female cams 25, 25' are in the extreme rear position or the apparatus is in the position of maximum overdrive, it is apparent since the inner female cams 25, 25', at this instant, are disposed considerably to the right of extreme left-hand or rearward position, the prime mover or engine 10 can readily develop the pressure of 300 pounds per square inch within the work chambers P, P' and the primary regulating chamber C. The presence of this pressure of 300 pounds per square inch within the primary regulating chamber C will cause a balance with the constant 300 pounds per square inch pressure within the secondary regulating chamber C' and will, thus, cause cessation of movement of the inner female cams 25, 25' from right to left in Figure 3.

Under the conditions of this particular engine, the vehicle will be accelerating at some particular rate. This rate may be calculated and expressed in terms of foot pounds of torque being delivered from the output shaft 11', provided that a given position of the inner female cams 25, 25' is assumed. At any given position of the inner female cams 25, 25', it is apparent that a given cross-section of the total areas of the gates or vanes 34', 35' is disposed within the work chamber P' of the motor 20'. Since it has been assumed that the radius of gyration of these vanes is constant at one-third foot, and the fluid pressure within chamber P' is also constant at 300 pounds per square inch as controlled by the pressure in the secondary regulating chamber C', it is apparent that, as the inner female cams 25, 25', move from right to left with the consequent decrease of effective cross-sectional area of the vanes 34', 35' disposed within the chamber P', the torque being developed in the shaft 11' is constantly decreasing. If the magnitude of this torque is allowed to continue to decrease, an equality will finally be reached where the torque being developed in shaft 11' will be exactly equal to the torque required to hold a certain velocity or speed of the vehicle as it progresses along the smooth level roadway heretofore mentioned. It might be stated that, if a prime mover or engine of higher power were to replace the one considered in this method of operation, the position of the inner female cams 25, 25' would automatically be disposed farther to the left or further rearwardly in order to counteract the higher power of the prime mover.

Since the transmission is now functioning at a relatively high range of overdrive, it is apparent that the operator of the vehicle must, of necessity, reduce the speed of the prime mover, or engine, or the number of revolutions per minute of the input shaft 11, if it is desired that the vehicle travel at the same speed. In other words, this transmission automatically determines the torque required to overcome a given resistance and automatically requires that the speed of the prime mover be reduced to a value which will exactly furnish the power required to overcome this given resistance. The ratio of the transmission is determined entirely by the magnitude of the torsional resistance to rotation of the output shaft 11' as compared with the magnitude of torque that the prime mover is capable of developing.

Vehicle traveling up hill

Now, assuming that the original engine 10 is driving the vehicle and that the vehicle is approaching hilly terrain, it is well known that more power is required to move a given weight at a given speed or velocity upwardly along an inclination as compared to the amount of power required to move a given weight along a level surface and, of course, a negative power is required in moving said given weight at a given velocity down an inclined surface. In either event, it is necessary that means be provided for producing or absorbing energy. The present improved transmission makes it possible for the engine 10 to serve both of these purposes in a most efficient and effective manner.

Hereinafter, it is to be assumed that the vehicle is initially moving along a relatively level smooth roadway or terrain, then moving up a first incline or hill, then reaching the summit of the incline and then traveling downwardly along a second incline or hill and returning to relatively level terrain. It is to be further assumed that the speed of the vehicle will be maintained constant throughout such travel at, say, fifty miles per hour and that the horse power of the engine 10 is sufficient to maintain this rate of speed up the first incline and down the second incline above described.

Now, it is to be assumed that the vehicle is traveling along a portion of level road at a speed of fifty miles per hour, which speed has been reached in the manner heretofore described.

Accordingly, the output shaft 11' is rotating at a relatively high rate of speed and the auxiliary pump 120, operating in conjunction with the relief valve 116, is maintaining a constant pressure of 300 pounds per square inch within the chamber C'.

Since the velocity or speed of fifty miles per hour has been reached and is being maintained, it follows that the pressure within the chambers C, P, P' and all connecting piping has also a pressure therein of 300 pounds per square inch and that the inner female cams 25, 25' are disposed to the left a sufficient distance such that the total cross-sectional area of the portions of the gates 34', 35' remaining within the chamber P' has been reduced to a value, which, if measured by square inches and multiplied by the existing pressure of 300 pounds per square inch and the radius of gyration of one third foot, would result in a torque, measured in foot pounds, which would exactly balance the torque required to maintain the velocity or speed of the vehicle along this level portion of terrain at fifty miles per hour. Referring to Figure 3, it will be noted that the sum of the areas of the portions of the gates or vanes 34', 35' disposed within the motor work chamber P' and the areas of the portions of the gates of vanes 34, 35 disposed within the pump work chamber P is always constant regardless of the position of the inner female cams 25, 25' relative to the main core cams 21, 21'. In other words, if the inner female cams 25, 25' are moved to the left a sufficient distance to subtract one square inch from the effective cross-sectional area of the portions of the vanes 34', 35' disposed within the chamber P', it is apparent that, simultaneously, one square inch is being added to the effective cross-sectional area of the portions of vanes 34, 35 disposed within the chamber P. Referring again to the hypothetical vehicle which is still traveling along the level terrain at a velocity or speed of fifty miles per hour, with the inner female cams 25, 25' disposed considerably to the left of center in Figure 3 because of the relatively low resistance to rotation which is being presented to the output shaft 11', the effective cross-sectional area of the vanes 34', 35' disposed within the chamber P' at this instant is relatively low and it is apparent that the difference between this area and the above-mentioned constant area determines the effective area of those portions of the vanes 34, 35 which are disposed within the primary work chamber P.

Assuming that the total effective cross-sectional area of the portions of the vanes 34', 35' and 34, 35 disposed within the respective work chambers P', P, is ten and one-tenth square inches, and that the cross-sectional area of the portions of the vanes 34', 35' within the secondary work chamber P' is, at this instant, two square inches, it follows that the area of the portions of the vanes 34, 35 disposed within the primary work chamber P is eight and one-tenth square inches and that the input shaft 11 is rotating at approximately twenty-five percent of the speed of the output shaft 11', or that the apparatus is at a ratio of 4 to 1 overdrive. Accordingly, it is apparent that the engine is at this instant developing a torque in the input shaft 11 of approximately eight hundred foot pounds and that the output shaft 11' is delivering to the wheels a torque of two hundred foot pounds.

As the vehicle enters the first incline it is necessary that more torque be developed in the output shaft 11', if the speed of the vehicle is to be maintained. Of course, the operator of the vehicle will immediately notice a tendency for the speed of the vehicle to diminish and, in order to maintain the speed of the vehicle, the operator has to introduce additional fuel to the vehicle in the usual manner to thereby increase the torque being developed by the engine 10.

It shall be assumed that, for an instant, the torque now being developed by the engine 10 is doubled or equal to approximately sixteen hundred foot pounds as compared to eight hundred foot pounds which was developed by the engine 10 at the time it was moving only along the level terrain. It follows that, if the inner female cams 25, 25' were prevented from moving axially, the pressure in the chambers P, P' and C would also be doubled thereby obtaining a value of six hundred pounds per square inch. It is apparent that, under these conditions, there is a very definite overbalance of pressures between the regulating chambers C, C' which is tending to move the cams 25, 25' axially from left to right. Since the inner female cams 25, 25' are then quite free to move, it is apparent that they will then be moved from left to right in fact. As the inner female cams 25, 25' move from left to right in Figure 3, it follows that, since the vanes 34, 35 also move therewith and correspondingly decrease the area in the primary work chamber P, the pumping capacity of the pump 20 will decrease as the capacity of the motor 20' to receive fluid increases.

Assuming that the operator of the vehicle has increased the flow of fuel to the engine 10 exactly the amount required to provide the additional power necessary for the vehicle to ascend the first incline at a speed of fifty miles per hour, it follows that the inner female cams 25, 25' will continue to move from left to right in Figure 3 until the pressure within the chambers P, P', C returns to 300 pounds per square inch, thus re-creating balanced pressures in the operating chambers C, C'. Since no excess power is being developed by the engine 10, the speed of the vehicle, which may have decreased slightly as the vehicle started up the first incline will return to fifty miles per hour the instant that the pressure in chambers P, P', C again reaches 300 pounds per square inch.

Since the weight of the vehicle, the angle of the inclined portion of the terrain and the frictional resistance of various operating parts of the vehicle are unknown, it is apparent that the torque which must be developed in the output shaft 11' is unknown. However, it shall be assumed that the inner female cams 25, 25' moved from left to right in Figure 3 a distance such that approximately six square inches total effective area of the vanes 34', 35' are disposed within the work chamber P' of the motor 20' and, of course, that a total of approximately four square inches of effective area of the vanes 34, 35 are disposed within the work chamber P of the pump 20. Given this position of the cams 25, 25' and the corresponding effective pressure areas between the two fluid units 20, 20' of the transmission, it is apparent that, since the pressure within the secondary work chamber P' has stabilized at 300 pounds per square inch, the torque now being developed in the output shaft 11' is six hundred foot pounds as compared to the original of two hundred foot pounds. Of course, the revolutions per minute or speed of the output shaft 11' has not changed, since the vehicle is still traveling at a speed of fifty miles per hour.

The position of the inner female cams 25, 25' and the relative position of the vanes 34, 35 and 34', 35' in this instance, determines that the ratio of the transmission is now three-to-two underdrive or that the input shaft 11 is rotating three revolutions with every two revolutions of the output shaft 11', this being compared to the original one to four overdrive. It follows that the speed of the input shaft 11 of the engine 10 is now six times greater than its original rate of rotation and the torque being developed in the input shaft 11, in this instance, is four hundred foot pounds or one half of the original value.

Considering the original torque and revolutions per minute as against the present torque and revolutions per minute, it is apparent that the engine 10 is now developing horse power at a value three times greater than the original value. Since, the horse power output of the engine 10 has been increased it is apparent that the transmission has made the necessary adjustments which will enable the vehicle to maintain the velocity of fifty miles per hour as it ascends the first incline.

It should be noted that the energy input and the energy output of the transmission are trebled in this instance. This is apparent, since the torque of the output shaft 11' trebled with no change in the revolutions per minute thereof, while the torque of the input shaft 11 was reduced to one half of its original torque and the speed of the input shaft 11 has increased to six times its original speed.

*Vehicle traveling down hill*

It shall now be assumed that the vehicle has reached the summit of the first incline and is commencing to move down the second incline, which extends at substantially the same angle as the first incline up which the vehicle has passed. Accordingly, it shall also be assumed that the operator of the vehicle has substantially decreased the flow of fuel to the engine 10, thus permitting the engine 10 to develop its maximum capacity to decelerate. As the operator decreases the flow of fuel as last described, the inner female cams 25, 25' are disposed forwardly of the position of maximum overdrive and the area of the portions of the gates 34, 35 disposed within the primary work chamber P is substantially low as compared to the area of the portions of the gates 34', 35' disposed within the secondary work chamber P'. Accordingly, it is apparent that, for the prime mover 10 to be forced to rotate against its maximum capacity to decelerate, a pressure greatly in excess of three hundred pounds per square inch will be required within the decelerating portions of the primary work chamber P.

Assuming this excess pressure to be present within the decelerating portions of the chamber P, it follows that this pressure exists within all of the deceleration piping of the transmission as well as within the secondary work chamber P' and the primary regulating chamber C.

As this pressure registers within chamber C, it follows that the pressure in chamber C will over-balance the constant pressure of three hundred pounds per square inch in the chamber C'. This over-balancing pressure causes the cams 25, 25' to begin to move axially further to the right and, in so doing, will cause the parts of the transmission to move further and further into underdrive ratios.

If this condition were allowed to continue, it follows that the parts of the transmission would occupy the position of maximum underdrive and the speed of the prime mover 10 would be so great as to approach infinity. The capacity of the prime mover 10 to decelerate the vehicle would also be so great as to nearly approach infinity. This condition could not be tolerated in an actual vehicle for obvious reasons. However, it is above set forth in order to clarify the infinite range of ratios which are possible in this improved transmission.

Returning to the hypothetical vehicle, which is now proceeding down the second incline at a velocity of fifty miles per hour, with the accelerator of the vehicle in the idling position, it is to be assumed that the operator again introduced fuel to the engine or prime mover 10 and reduced the capacity of the prime mover 10 to decelerate to the extent that the speed of the vehicle may be maintained at fifty miles per hour.

Since the two inclines have been assumed to be equal but opposite, it is apparent that, since an increase of four hundred foot pounds of torque, over that which was required to impart movement to the vehicle along level terrain, was required to cause the vehicle to ascend the first incline, a corresponding decrease of four hundred foot pounds would be required to permit the vehicle to move down the second incline at the pre-determined rate of descent. It may be established, therefore, that a torque of minus two hundred foot pounds must be developed in the shaft 11'. Since this torque value and the torque value required to maintain the speed of fifty miles per hour on level terrain are equal, except in sign, it is apparent that the transmission will return to a position of one revolution of the input shaft 11 to four revolutions of the output shaft 11' or to a four to one overdrive.

Under these conditions the constant fluid pressure of three hundred pounds per square inch within the transmission proper will be effective upon exactly the same cross-sectional area of the gates 34', 35' within the secondary work chamber P' and will therefore develop the same amount of torque. In this particular instance, however, the normally output shaft 11' has become the input shaft and the normally input shaft 11 has become the output shaft and, therefore, the pressure will be acting in the deceleration portions of the chambers P and P' or opposite sides of the vanes 34, 35 and 34', 35' of both respective chambers P, P'. Under these conditions, the torque being developed will tend to drive the shaft 11' in the opposite or reverse direction thereby providing the negative acceleration required or, in other words, the positive deceleration, which will prevent the vehicle from increasing its velocity or rate of descent.

If it is now assumed that the vehicle is gradually returning to level terrain, it follows that the negative torque existing in shaft 11' must be gradually reduced until at some point, it reaches zero. Since the energy which is creating the pressure within the chambers P, P' and C is being derived from the acceleration effect of gravity and it is being assumed also that the terrain as becoming level with the progression of the vehicle, it follows that the magnitude of the energy being derived from the acceleration affected by gravity is constantly decreasing. As a result of this condition, it is apparent that the pressure within the chambers P, P', C is also decreasing.

As the latter decreasing pressure registers in the primary regulating chamber C, it is apparent that the constant pressure of three hundred pounds per square inch within the chamber C' will effect movement of the inner female cams 25, 25' axially to the left or rearwardly in Figure 3, thus causing the various moving parts of the transmission to occupy the position of maximum overdrive. If the operator properly reduced the speed of the prime mover 10 to conform with the decreasing energy values required, the transmission would reach the position of maximum overdrive at the point in the terrain where the acceleration of gravity alone would maintain the desired constant velocity or speed of fifty miles per hour.

Beyond this point the movable parts of the transmission would shift into acceleration automatically and return to the four to one overdrive position, for example, in the manner substantially as described.

The valves 87, 88, 111, 116, 124, 125 may be operated in any desired manner and by any suitable means. Of course, in the event of the improved transmission being used in an automotive vehicle, the controls for these valves would be disposed adjacent the steering wheel or within reach of the operator of the vehicle. Thus, in order to cause the output shaft or rear shaft 11' to rotate in the reverse direction relative to the input shaft 11, it is merely necessary to rotate the cores of the valves 87, 88, 124, 125 so the passageways in valve 87 will direct the fluid under pressure from the conduit 81, through valve 87 and conduit 95 into the conduit 81' and the passageways in valve 88 would direct the returning fluid from the conduit 83' through the conduit 96, through the valve 88 and through the conduit 83. It is apparent that this would reverse the direction of flow of the fluid into and out of the work chamber P' of the motor 20', although the flow of fluid into and out of the work chamber P of the pump 20 remains the same regardless of which direction rotation is imparted to the output shaft 11'.

*Modified form of pump construction*

Figure 14:
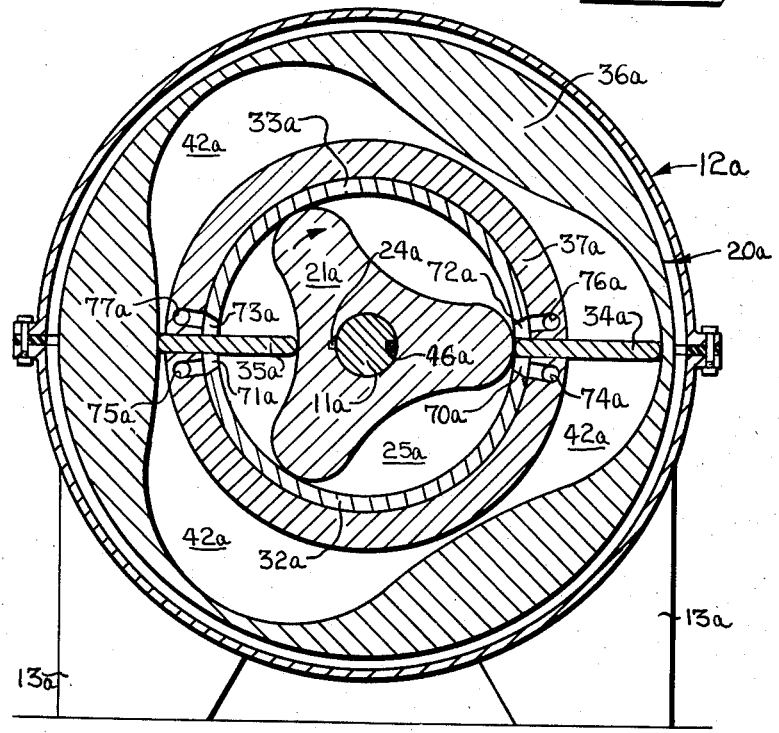
Figure 14 is a transverse sectional view taken substantially along line 14—14 in Figure 12.

In Figures 11, 12, 13, 14 and 15 there is shown another form of fluid unit construction embodying the principles of the present invention wherein the fluid unit may serve as a relay pump or may receive fluid from a suitable source and transmit the fluid under predetermined pressure to another location. The parts shown in Figures 11, 12 and 14 are substantially the same as the parts shown in the right-hand portions of Figures 1, 2, 3, 5, 9 and 10 and, therefore, those parts in Figures 11, 12, 13, 14 and 15 which are substantially the same as those shown in the right-hand portion of Figures 1, 2, 3, 5, 9 and 10, will bear the same reference characters with the small letter "a" affixed thereto, except as will be otherwise described hereinafter.

It should be noted that the size of the work chamber of the pump 20a in Figure 12, that is, the distance between the outer or corresponding edges of the intermediate female cam 25a and the main core cam 21a is determined by manual adjustment of the intermediate female cam 25a, the annular plate 26a, the segmental pressure chamber wall members 32a, 33a, the outer core cam 44a, the circular member 45a and the gates or vanes 34a, 35a axially of the input shaft 11a, the main and intermediate core cams 21a, 41a, the outer work chamber wall member 55a, the sealing element 62a, the intermediate female cam housing 38a and its enlarged portion 37a, the outer female cam 36a and the main housing or casing 12a.

Any desired means may be employed for effecting adjustment of the intermediate female cam 25a axially of the main core cam 21a and such means may be remotely controlled, if desired. However, in the present instance, the position of the intermediate female cam axially of the main core cam 21a is controlled by a threaded shaft 130 which threadably penetrates a cover or plate 131 on the rear or left-hand end of the main housing or main casing 12a. It should be noted that the modified form of pump structure as best shown in Figure 12 is devoid of servometer compartments or chambers such as the chambers C, C' shown in Figure 3 and, instead, the element 100a in Figure 12 is shown as being formed as a part of the main housing 12a and is provided with a bore 132 in which the shaft 27a has axial or longitudinal sliding movement.

The outer end of the threaded shaft 130 has a suitable hand wheel 134 fixed thereon for manipulation by an operator in varying the position of the intermediate female cam 25a axially of the shaft 11a and the main core cam 21a. The inner end of the threaded shaft 130 has an enlarged portion 135 thereon which is rotatable in the corresponding end of the shaft 27a and which is confined therein by means of an end plate 136. The left-hand end of the tubular shaft 27a is closed, as at 137 and the tubular shaft 27a is provided with a passageway 140 through which fluid or air, as the case may be, may pass as the tubular shaft 27a moves axially relative to the input shaft 11a. Also, in order to permit the fluid to flow from one side of the disk 26a to the other thereof, the disk 26a is provided with a passageway 141 extending therethrough.

It is thus seen that rotation of the shaft 130 in either direction will cause the intermediate female cam 25a to move axially relative to the main core cam 21a to correspondingly vary the size of the work chamber, defined between the outer end of the female cam 25a and the outer chamber wall member 55a, to thereby correspondingly vary the effective pressure output of the pump 20a.

Figure 15:
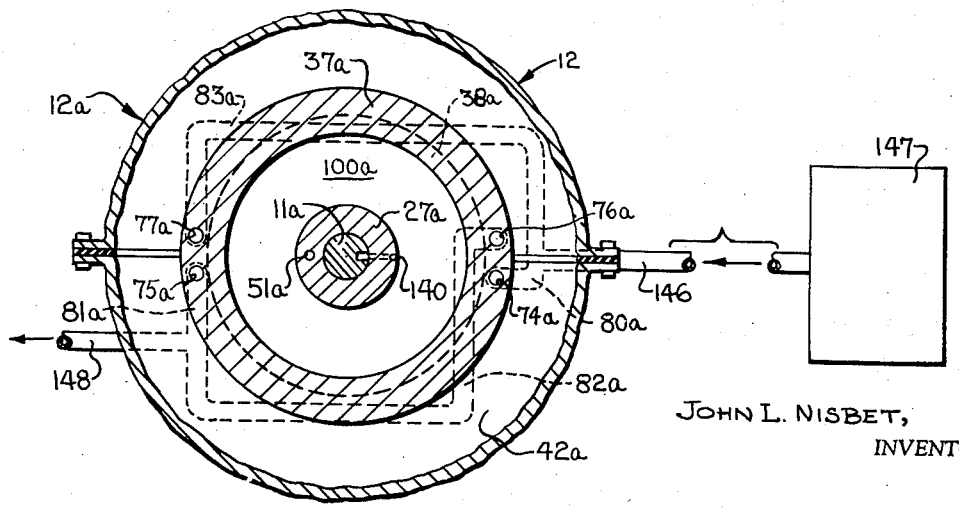
Figure 15 is a partially schematic transverse sectional view taken substantially along line 15—15 in Figure 12.

The modified form of pump structure shown in Figures 11 through 15 may be used for supplying fluid under pressure to a hydraulically operated apparatus such as a hydraulic cylinder or hydraulic motor of any design or it may be used as a relay pump for transmitting fluid from one place to another, such as conveying oil from one community to another. For purposes of description it is to be assumed that the conduits 80a, 83a lead from the respective passageways 74a, 77a in the enlarged portion 37a of the intermediate female cam housing 38a to a common inlet pipe 146 which, in turn, leads to a suitable source of fluid 147 (Figures 13 and 15). The conduits 81a, 82a lead from the respective passageways 75a, 76a in the enlarged portion 37a of the intermediate female cam housing 38a to a common discharge pipe 148.

Thus, assuming that the shaft 11a and the main core cam 21a are driven in a clockwise direction in Figures 14 and 15, negative pressure is created on the upper surface of that portion of the gate 35a which may be disposed within the work chamber and a negative pressure will be effected adjacent that portion of the lower surface of the vane or gate 34a which is disposed within the work chamber of the pump 20a and this will draw the fluid from the source 147 through the pipe 146 and simultaneously through pipes 80a, 83a, through the passageways 74a, 77a and through the coinciding ports or passageways 70a, 73a in the segmental pressure chamber wall members 32a, 33a, respectively, and into the work chamber of the pump 20a. Of course, rotation of the main core cam 21a will also create a positive pressure against the lower surface of the portion of the gate 35a disposed within the work chamber and against the upper surface of that portion of the gate 34a disposed within the work chamber of the pump 20a and, as the fluid is introduced into the work chamber in the manner heretofore described, it will be forced outwardly through the passageways or ports 71a, 72a in the respective segmental pressure chamber wall members 32a, 33a which happen to coincide with the passageways 75a, 76a in the enlarged portion 37a of the intermediate female cam housing 38a.

The fluid will then pass through the passageways 75a, 76a and simultaneously through the pipes or conduits 81a, 82a and thus be discharged through the discharge pipe 148.

It is apparent that the volume or pressure of the fluid withdrawn from the source 147 and discharged through the discharge pipe 148, is determined by the size of the work chamber which is, in turn, determined by the position of the intermediate female cam 25a relative to the outer or right-hand surface of the main core cam 21a in Figure 12.

It is thus seen that I have provided a novel form of pump structure comprising a main core cam fixed on a driven shaft whose outer peripheral surface mates with the inner peripheral surface of an intermediate female cam and wherein means are provided to close the ends of the spaces between adjacent lobes of the main core cam to form a work chamber between each adjacent pair of lobes. Also, one or more radially movable gates are maintained in engagement with the periphery of the main core cam and are shiftable axially with the female cam to vary the size of the work chamber and, accordingly, to vary the capacity of the pump. Thus, the fluid is forced outwardly from the pump under pressure through rotation of the main core cam relative to the radially movable vanes or gates with fluid ports being provided in the circular walls of the work chamber, which ports are disposed adjacent the pressure sides of the gates to thus discharge the fluid from the work chamber through the latter ports under predetermined pressure.

Referring again to the original form of the invention disclosed in Figures 1 to 10, inclusive, although the pump 20 and motor 20' are shown in axial alinement with each other, it is contemplated that any desired number of such fluid units may be provided in series, wherein the first of a series could control the operation of the second of a series and the second of a series could control the operation of a third of a series, etc. In this instance, a set of servomotor or regulating chambers such as chambers C, C' would be required for each of said fluid units and suitable means could be provided between adjacent fluid units to cause the axially movable intermediate female cam of the second unit in a series to respond to axial movement of the intermediate female cam of a first unit in said series and vice versa. The connections between the fluid units, although the units may be disposed remotely from each other, may be readily effected by electrical, pneumatic or hydraulic means without departing from the spirit of the invention. Thus, a detailed illustration and description of two or more units of the character described arranged in series is deemed unnecessary, since they would function in substantially the manner of the transmission shown in Figures 1 to 10, inclusive.

In the drawings and specification there have been set forth preferred embodiments of the invention and, although specific terms are employed, they are used in a generic and descriptive sense only, and not for purposes of limitations, the scope of the invention being defined in the claims.

I claim:

1. A fluid pump structure comprising a driven shaft, an irregular core cam fixed on the shaft, a mating female cam mounted for axial movement on the core cam, a tubular wall engaging one end of the female cam and adapted to encircle the corresponding end of said core cam, at least one vane mounted for radial movement in and being of substantially the same length as said tubular wall, means to maintain said vane in contact with said irregular core cam, a stationary housing in which said female cam, said tubular wall and said vane are mounted for axial movement and in which the tubular wall and vane are restrained from rotation, closure means on said corresponding end of said core cam and in which said vane also has radial as well as axial movement, means to axially vary the position of said female cam with the vane and the tubular wall relative to the core cam and the closure means to form a work chamber of variable volume between said one end of the female cam and said closure means, and said housing and tubular wall having coinciding fluid passageways therein communicating with said chamber closely adjacent opposite sides of said vane.

2. A fluid pump comprising a pair of relatively axially movable inner and outer cams having interengaging irregular surfaces thereon, means to rotate said cams, one end of said inner cam extending outwardly relative to the outer cam, circular closure means on said one end of the inner cam of a diameter substantially the same as that defined by rotation of the high point of the inner cam, the closure means and the adjacent end of said outer cam defining a pressure chamber therebetween, a circular wall in which the portion of said inner cam extending beyond the outer cam has sliding rotational movement, a housing in which said circular wall and said outer cam have axial movement, at least one relatively thin gate slidably penetrating said circular wall, said housing and said closure means, means to maintain the radially inward edge of said gate in sliding contact with the periphery of the inner cam, means to channel fluid into said chamber adjacent one side of the gate, means to channel fluid out of the chamber adjacent the other side of the gate, and means for axially varying the position of the outer cam, the circular wall and the gate relative to the inner cam and the closure means to vary the volumetric capacity of the pressure chamber.

3. A fluid pump structure comprising a driven shaft, an irregular core cam fixed on the shaft, a mating female cam mounted for axial movement on the core cam, a tubular wall engaging one end of the female cam and adapted to encircle the corresponding end of said core cam, said tubular wall comprising a plurality of circularly spaced segments defining slots therebetween, a plurality of relatively thin flat vanes mounted for radial movement in said slots and being of substantially the same length as said tubular wall, means to maintain the radially inward edges of said vanes in contact with said irregular core cam, a stationary housing in which said female cam, said tubular wall and said vanes are mounted for axial movement and in which the tubular wall and vanes are restrained from rotation, closure means on said corresponding end of said core cam and in which said vanes also have radial as well as axial movement, means to axially vary the position of said female cam with the vanes and the tubular wall relative to the core cam and the closure means to form a work chamber of variable cubic capacity between said one end of the female cam, said tubular wall, said vanes and said closure means, and said housing and tubular wall having coinciding fluid passageways therein communicating with said chamber closely adjacent opposite sides of each vane.

4. A fluid pump structure comprising a stationary housing, a shaft journaled in said housing, a core cam fixed on said shaft and having an irregular peripheral surface forming at least one high point and at least one low point thereon, a female cam having an inner periphery corresponding to the outer periphery of the core cam and mounted for relative axial movement on the core cam, one end of said core cam normally extending outwardly beyond the corresponding end of said female cam, a tubular wall slidably and rotatably engaging said corresponding end of the female cam and encircling the exposed end of the core cam, at least one vane mounted for radial movement through said tubular wall and through said housing, said vane being of substantially the same length as said tubular wall, means to maintain said vane in contact with said core cam, said female cam, said tubular wall and said vane being axially movable in unison relative to the housing, said tubular wall and said vane being restrained from rotation relative to the housing, closure means on said one end of said core cam in which said vane also has radial as well as axial movement, means to effect relative axial movement between said female cam, with the vane and the tubular wall, and said core cam and the closure means to form a volumetrically variable pressure chamber between said corresponding end of the female cam and said closure means, and said housing and tubular wall having coinciding fluid passageways therein communicating with said chamber closely adjacent opposite sides of said vane.

5. A fluid pump structure comprising a stationary housing, a shaft journaled in said housing, a core cam fixed on said shaft and having an irregular peripheral surface forming at least one high point and at least one low point thereon, a female cam having an inner periphery corresponding to the outer periphery of the core cam and mounted for axial movement on the core cam, one end of said core cam normally extending outwardly beyond the corresponding end of said female cam, a tubular wall slidably and rotatably engaging said corresponding end of the female cam and encircling the exposed end of the core cam, said tubular wall having at least one longitudinal slot therein, said housing having a longitudinal slot therein coinciding with and being of substantially greater length than the slot in said tubular wall, a substantially flat vane mounted for radial movement in said slots in the tubular wall and in said housing, said vane being of substantially the same length as said tubular wall, means to maintain said vane in contact with said core cam, said female cam being axially movable along with the vane and the wall relative to the housing, closure means on said one end of said core cam and in which said vane also has radial as well as axial movement, means to effect relative axial movement between said female cam and said core cam to form an effective variable capacity pressure chamber between said corresponding end of the female cam and said closure means, and said housing and tubular wall having coinciding fluid passageways therein communicating with said chamber closely adjacent opposite sides of said vane.

6. An improved pump structure comprising a main housing, a driven shaft extending into said main housing and being journaled therein, a stationary inner housing disposed in said main housing, a female cam mounted for axial movement in said inner housing, a main core cam having its outer peripheral surface mating with the inner peripheral surface of said female cam, said core cam being fixed on said driven shaft to thereby simultaneously impart rotation to the female cam, a plurality of gates mounted for radial and axial movement in the inner housing, means to maintain the radially inward edges of the gates in engagement with the periphery of the main core cam, a circular closure member disposed adjacent the outer end of said core cam relative to the female cam for closing the spaces between adjacent high points of the core cam to thereby define a volumetrically changeable pressure chamber between the closure member and the corresponding axial end of the female cam, segmental wall members having an inner radius substantially equal to the radius of the high points of said core cam, means to maintain corresponding ends of the segmental wall members in engagement with the outer end of the female cam, said segmental wall members having a row of longitudinally spaced openings therein disposed adjacent opposite sides of each of said gates, said inner housing being provided with a passageway therein disposed closely adjacent the radial plane of the outer edge of the main core cam and corresponding to each of said rows of openings in the segmental wall members, and means to vary the position of the female cam and the gates axially of the core cam and the closure member to thereby vary the axial length of that portion of each gate which is disposed within the radial plane of the core cam and to accordingly vary the size of the pressure chamber whereby rotation of the core cam will effect reciprocatory radial movement of the gates and will force fluid introduced into the pressure chamber from those passageways disposed on the low pressure sides of the gates outwardly through the passageways disposed on the high pressure sides of said gates as effected by rotation of the main core cam relative to the gates.

7. A fluid pump structure comprising a stationary main housing adapted to contain a supply of fluid, an inner housing fixed in the main housing, a driven shaft journaled in said housings, a core cam fixed on said shaft and having an irregular external peripheral surface forming at least one high point and at least one low point thereon, an inner female cam having an inner periphery corresponding to the outer periphery of the core cam and mounted for relative axial movement on the core cam and in the inner housing, one end of said core cam normally extending outwardly beyond the corresponding end of said female cam, a tubular wall slidably and rotatably engaging said corresponding end of the female cam and encircling the exposed end of the core cam and being axially movable in said inner housing, at least one vane mounted for radial movement in said tubular wall and guided for radial and axial movement in the inner housing, said vane being of substantially the same length as said tubular wall, an outer female cam rotatably mounted on the inner housing and having an irregular internal periphery corresponding to the irregular external periphery of the core cam and engaging the radial outer edge of said vane to maintain said vane in contact with said core cam, closure means on said one end of said core cam and in which said vane also has radial as well as axial movement, means to effect relative axial movement between said inner female cam, with the vane and the tubular wall, and said core cam and the closure means to form a variable pressure chamber between said corresponding end of the female cam and said closure means, and said inner housing and tubular wall having coinciding fluid passageways therein communicating with said chamber closely adjacent opposite sides of said vane.

8. A pump and motor transmission comprising an elongated stationary first housing, axially alined in-put and out-put shafts journaled in said housing, a floating tube in which the proximal ends of said in-put and out-put shafts are loosely mounted, a pump unit and a motor unit disposed within said housing and surrounding the respective in-put and out-put shafts, each unit comprising an irregular core cam fixed on the corresponding shaft, a mating female cam mounted for axial movement on each core cam, a tubular wall engaging the axial outer end of each female cam and adapted to encircle the corresponding end of the corresponding core cam, at least one vane mounted for radial movement in and being of substantially the same length as each tubular wall, means to maintain each vane in contact with the corresponding irregular core cam, said tubular walls, female cams and vanes being mounted for axial movement in said stationary housing, said tubular walls and their respective vanes being restrained from rotation relative to the stationary housing, closure means on the distal ends of said core cams and in which the respective vanes also have radial as well as axial movement, the distal ends of said female cams and the respective closure means defining respective primary and secondary work chambers therebetween for the pump unit and motor unit, respectively, said housing having a substantially centrally disposed transverse partition therein loosely penetrated by said floating tube, the proximal ends of said female cams having respective annular plates fixed thereon and being rotatable on opposite ends of said floating tube, but being restrained from axial movement relative to the floating tube, thereby defining a primary regulating chamber between the annular plate of the pump unit and the partition and a secondary regulating chamber between the annular plate of the motor unit and said partition, said first housing and each of said tubular walls having coinciding fluid passageways therein communicating with the respective work chambers closely adjacent opposite sides of the respective vanes, first conduit means connecting the fluid passageways on one side of the vane of the pump unit with the pasageways on one side of the vane of the motor unit, second conduit means connecting the passageways on the other side of the vane of the pump unit with the pasageways on the other side of the vane of the motor unit, an auxiliary pump driven by the out-put shaft, a main housing encircling the first housing for containing fluid therein, third conduit means connecting the auxiliary pump with the secondary regulating chamber for pumping fluid from the main housing into the secondary regulating chamber, and fourth conduit means connecting the first and second conduit means with the primary regulating chamber whereby variations of the pressure in the primary and secondary regulating chambers causes the two female cams to move axially in unison relative to the respective core cams to proportionately vary the size of the work chambers.

9. A fluid pump structure comprising a driven shaft, an inner irregular core cam fixed on the shaft, a mating female cam mounted for axial movement on the inner core cam, an additional core cam spaced axially outward from one end of the inner core cam and movable in unison with the female cam, a tubular wall engaging the end of the female cam adjacent said one end of the core cam and adapted to encircle the corresponding end of said inner core cam and also encircling the outer core cam, at least one vane mounted for radial movement in said tubular wall, means to maintain the radially inward edge of said vane in contact with said inner and outer core cams, a stationary housing in which said female cam, said tubular wall, said vane and said outer core cam are mounted for axial movement and in which the tubular wall and vane are restrained from rotation, closure means on said one end of said core cam and in which said vane also has radial as well as axial movement, means to axially vary the position of said female cam with the vane, the tubular wall and the outer core cam relative to the inner core cam and its closure means to form a pressure chamber between said female cam and said closure means, and said housing and tubular wall having coinciding fluid passageways therein communicating with said chamber closely adjacent each side of said vane for directing fluid into and out of said chamber.

10. An improved pump structure comprising a main housing, a driven shaft extending into said main housing and being rotatable therein, a stationary intermediate housing disposed in said main housing, a female cam mounted for axial movement in said intermediate housing, a core cam having its outer peripheral surface mating with the inner peripheral surface of said female cam, said core cam being fixed on said driven shaft to thereby simultaneously impart rotation to the female cam, said intermediate housing having a plurality of circularly spaced radial slots therein, a gate mounted for radial and axial movement in each slot in the intermediate housing, means maintaining the radially inward edges of the gates in engagement with the periphery of the core cam, a circular closure member disposed adjacent the outer end of said core cam relative to the female cam for closing the interspaces between adjacent high points of the core cam to thereby define a pressure chamber between the closure member and the adjacent end of the female cam, segmental wall members each having an inner radius substantially equal to the radius of the high points of said core cam and maintained in contact with the outer end of the female cam and in which the core cam and the closure member have axial sliding movement, said segmental wall members each having a row of longitudinally spaced openings therein disposed adjacent opposite sides of each gate, said intermediate housing being provided with a fluid passageway therein disposed closely adjacent the radial plane of the outer edge of the core cam and corresponding to each of said rows of openings in the segmental wall members, and means to vary the position of the female cam, the segmental wall members and the gates axially of the core cam and the closure member to thereby vary the axial length of that portion of each gate which is disposed within the radial plane of the core cam and to correspondingly vary the size of the pressure chamber whereby rotation of the core cam relative to the gates will effect reciprocatory radial movement of the gates and will force fluid introduced into the pressure chamber from those passageways disposed on the low pressure side of the gates outwardly through the passageways disposed on the high pressure sides of said gates.

11. A pump and motor transmission comprising at least a first and a second fluid unit structure each comprising an irregular core cam, a mating female cam slidably mounted for axial movement on said core cam, a circular wall member having one of its ends contacting one end of said female cam and in which the adjacent end of the high point or points of the core cam have sliding rotational movement, at least one vane slidably penetrating said circular wall member, means to maintain said vane in contact with the periphery of the core cam, a circular closure member on said adjacent end of the core cam and in which said vane has sliding radial and axial movement, each closure member and the adjacent end of the respective female cam defining a work chamber therebetween, a stationary housing in which the two female cams, their respective circular wall members and their respective vanes have unitary axial sliding movement and in which said female cams have rotative movement, means for driving the core cam and female cam of the first unit structure whereby the first unit structure serves as the pump and the second unit structure serves as the motor, said housing and each circular wall member having coinciding fluid passageways therein communicating with the respective work chambers closely adjacent opposite sides of each vane, conduit means connecting each passageway of the pump with a corresponding passageway of the motor, and means to increase the size of the chamber of the motor in response to decreasing the size of the chamber of the pump and vice versa whereby the core cam of the pump transmits pressure to, and drives, the core cam of the motor at varying ratios.

12. In a structure according to claim 11, means responsive to variations in the pressure transmitted from the chamber of the pump to the chamber of the motor for proportionately varying the positions of the two female cams relative to the core cams and to thereby vary the size of the work chambers of the pump and the motor.

13. In a structure according to claim 11, valve means interposed in said conduits and being so arranged as to reverse the side of the vane of the motor to which pressure is directed from the chamber of the pump and vice versa.

14. In a structure according to claim 11, means responsive to variations in torque load on the motor for proportionately varying the positions of the two female cams relative to the core cams and to thereby vary the size of the work chambers of the pump and the motor.

15. In a structure according to claim 12, valve means interposed in said conduits and being so arranged as to reverse the side of the vane of the motor to which pressure is directed from the chamber of the pump and vice versa.

16. A fluid transmission comprising an elongated stationary housing adapted to be filled with hydraulic fluid, axially alined in-put and out-put shafts journaled in said housing, a floating tube in which the proximal ends of said shafts are journaled, a pump and a motor disposed within said housing and surrounding the respective in-put and out-put shafts, the pump and the motor each comprising an irregular core cam fixed on the corresponding shaft and having at least one lobe defining a low portion, a mating female cam mounted for axial sliding movement on the core cam, a circular wall member engaging the axial outer end of the female cam and adapted to encircle the corresponding end of the core cam, at least one vane mounted for radial movement in and being of substantially the same length as each circular wall member, means to maintain each vane in contact with the corresponding irregular core cam, said circular wall members, female cams and vanes being guided for axial movement in said stationary housing, closure means on the distal ends of said core cams and in which the respective vanes have radial as well as axial movement, said vanes extending radially through said housing to thereby restrain the circular wall members and the closure means from rotation relative to the stationary housing, the distal ends of said female cams and the respective closure means defining respective primary and secondary work chambers therebetween for the pump and motor, respectively, said housing having a transverse partition therein slidably penetrated by said floating tube, the proximal ends of said female cams having respective plates fixed thereon rotatable on opposite ends of said floating tube, but being restrained from axial movement relative to the floating tube, thereby defining a primary regulating chamber between the plate of the primary pump and the partition and a secondary regulating chamber between the plate of the motor and said partition, said housing and each of said tubular walls having coinciding fluid passageways therein communicating with the respective work chambers closely adjacent opposite sides of the respective vanes, first conduit means connecting the fluid passageways on one side of the vane of the pump with the passageways on one side of the vane of the motor, second conduit means connecting the passageways on the other side of the vane of the pump with the passageways on the other side of the vane of the motor, an auxiliary pump driven by the out-put shaft, a main housing encircling the first housing for containing fluid therein, third conduit means connecting the auxiliary pump with the secondary regulating chamber for pumping fluid from the main housing into the secondary regulating chamber, and fourth conduit means connecting the first and second conduit means with the primary regulating chamber whereby variations of the pressure in the primary and secondary regulating chambers causes the two female cams to move axially in unison relative to the respective core cams to proportionately vary the size of the work chambers.

17. In a structure according to claim 16, regulator valve means communicating with said second regulating chamber for predeterminedly limiting the amount of pressure therein, check valve means for preventing back-flow of pressure from within the primary regulating chamber to either of the work chambers, and bleeder valve means to permit fluid to escape from the primary regulating chamber into said main housing whenever the size of the latter chamber decreases.

18. A fluid pump structure comprising a driven shaft, an irregular core cam fixed on the shaft, a mating female cam mounted for axial movement on the core cam, a tubular wall engaging one end of the female cam and adapted to encircle the corresponding end of said core cam, at least one vane mounted for radial movement in and being of substantially the same length as said tubular wall, means to maintain said vane in contact with said irregular core cam, a stationary housing in which said female cam, said tubular wall and said vane are mounted for axial movement and in which the tubular wall and vane are restrained from rotation, closure means on said corresponding end of said core cam and in which said vane also has radial as well as axial movement, means to axially vary the position of said female cam with the vane and the tubular wall relative to the core cam and the closure means to form a pressure chamber between said one end of the female cam and said closure means, said housing and tubular wall having first and second sets of coinciding passageways therein communicating with said chamber closely adjacent respective opposite sides of said vane, first conduit means for directing fluid from a source to the first sets of passageways, and second conduit means for directing the fluid pumped into the second passageways therefrom.

19. An improved pump structure comprising an outer element, an inner element disposed within said outer element, means to impart rotation to one of said elements relative to and about the axis of the other element, a stationary end wall member, an axially movable end wall member normally spaced from the stationary end wall member, at least one of said elements having an irregular peripheral cam surface adjacent the other element, at least one vane radially movable, at least in part, between said stationary and movable wall members and between said inner and outer elements, means maintaining one radial edge of said vane in contact with said cam surface, means to cause relative rotative movement between said element having the cam surface thereon and the vane, means to vary the effective surface area of that portion of the vane disposed between the stationary and movable end wall members, means to introduce fluid into the area between the stationary and movable end wall members adjacent one side of said vane, and means to direct the fluid out of the latter area adjacent the other side of said vane.

20. An improved pump structure comprising an outer element, an inner element disposed within said outer element, first and second axially spaced end wall members, at least one of said elements having an irregular peripheral cam surface adjacent the other element, at least one vane radially movable, at least in part, between said first and second end wall members, means maintaining one radial edge of said vane in contact with said cam surface, means to cause relative rotative movement between said element having the cam surface thereon and the vane, means to effect relative axial movement between the end wall members to vary the effective surface area of that portion of the vane disposed between the end wall members, means to introduce fluid into the area between the end wall members adjacent one side of said vane, and means to direct fluid out of the latter area adjacent the other side of said vane.

21. An improved pump structure comprising an outer female cam, an inner element loosely disposed within said outer cam, a stationary end wall member, an axially movable end wall member normally spaced from the stationary end wall member and being axially movable on the inner element and relative to the outer cam and said inner element, said female cam having an irregular peripheral cam surface adjacent the inner element, at least one vane radially movable, at least in part, between said stationary and movable wall members, means maintaining the radially outer edge of said vane in contact with said cam surface, means to cause relative rotative movement between said female cam and the vane, means to axially vary the position of the movable wall member relative to the inner element, the female cam and the stationary wall member to vary the effective surface area of that portion of the vane disposed between the stationary and movable end wall members, means to introduce fluid into the area between the stationary and movable end wall members adjacent one side of said vane, and means to direct fluid out of the latter area adjacent the other side of said vane.

References Cited in the file of this patent

UNITED STATES PATENTS

| | | |
|---|---|---|
| 815,522 | Fraser | Mar. 20, 1906 |
| 1,017,355 | White | Feb. 13, 1912 |
| 1,742,215 | Pigott | Jan. 7, 1930 |
| 1,914,090 | Hamilla et al. | June 13, 1933 |
| 2,161,439 | Thoma | June 6, 1939 |
| 2,524,278 | Thal | Oct. 3, 1950 |